Figure 1:
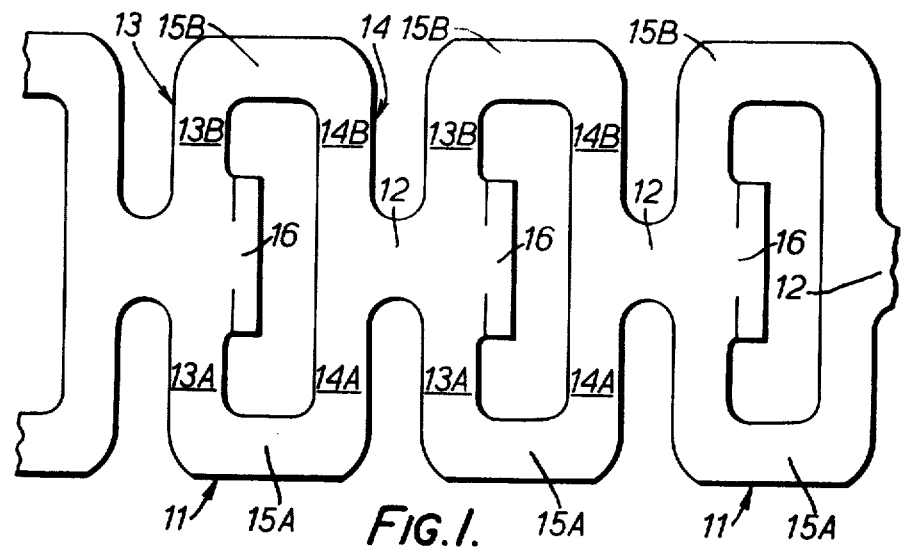

United States Patent [19] [11] 4,053,165
Hartley [45] Oct. 11, 1977

[54] OIL RING DESIGN

[75] Inventor: Edward Douglas Hartley, Halifax, England

[73] Assignee: Hepworth & Grandage Limited, EN

[21] Appl. No.: 641,372

[22] Filed: Dec. 17, 1975

[51] Int. Cl.² .............................................. F16J 9/06
[52] U.S. Cl. .................................... 277/140; 277/216
[58] Field of Search ............... 277/140, 139, 236, 138, 277/217, 216

[56] References Cited

U.S. PATENT DOCUMENTS

| | | | |
|---|---|---|---|
| 2,827,349 | 3/1958 | Burns | 277/140 |
| 2,886,384 | 5/1959 | Hamm | 277/140 |
| 3,081,100 | 3/1963 | Nisper | 277/140 |
| 3,381,971 | 5/1968 | Mayhew | 277/140 |
| 3,606,355 | 9/1971 | Minegishi | 277/140 |

FOREIGN PATENT DOCUMENTS

| | | | |
|---|---|---|---|
| 706,669 | 3/1965 | Canada | 277/140 |
| 1,453,344 | 5/1975 | Germany | |

Primary Examiner—Richard E. Aegerter
Assistant Examiner—L. Footland
Attorney, Agent, or Firm—Mawhinney & Mawhinney & Connors

[57] ABSTRACT

This invention relates to a piston ring having two ring elements and a spacer-expander the latter including a series of interconnected parts each comprising two pairs of inwardly directed limbs, the inner ends of which are in contact with and resiliently load the ring elements, and a spacer element which extends transversely to space apart the ring elements at the outer periphery.

6 Claims, 9 Drawing Figures

OIL RING DESIGN

This invention relates to piston rings and more particularly to piston rings of the kind which have two ring elements loaded into contact with the co-operating cylinder wall and a spacer-expander element which spaces the ring elements apart and provides the resilient loading. Such a piston ring will be referred to as 'a piston ring of the kind described'.

Examples of piston rings of this general kind may be found in U.S. Pat. No. 3,522,949, assigned to the assignee of the present application.

According to the present invention a piston ring of the kind described includes two ring elements and a spacer-expander element which spaces apart the ring elements and resiliently loads them in a radially outward direction, the spacer-expander element having its free ends in abutment and including a series of parts, each part comprising two pairs of inwardly-directed limbs, the inner ends of which are interconnected by respective portions which extend circumferentially and axially of the element, and the inner ends being in contact with and resiliently loading the ring elements, and a spacer element between the two pairs of limbs of each part, said spacer element being connected to the centre of said part and extending transversely to space apart said ring elements at the outer periphery of the spacer-expander element, said series of parts having means to interconnect them circumferentially, said means being at the outer periphery of the spacer-expander element.

In one embodiment according to the invention the spacer-element is closely adjacent to one of said pairs of limbs.

In a second embodiment the spacer element forms the cross-bar of a 'T'-shaped member which is cantilevered from the centre of each said part, the cross-bar being substantially equally spaced from each of said pairs of limbs.

In a third embodiment the circumferentially and axially extending portions which interconnect the radially inner ends of the limbs are crimped, whereby to draw the two pairs of limbs of a part closer together, the ring elements being supported and resiliently urged by the crimped portions.

One of the problems of designing spacer-expander elements for piston rings of the kind described is the problem of obtaining a low spring rate, i.e. a smaller load for a given deflection of the parts of the spacer-expander element in contact with the ring elements. The present inventor has discovered that the spring rate may be reduced by increasing the number of parts—each part including two pairs of limbs and the respective circumferentially interconnecting portions—per unit of circumferential length of the piston ring.

Figure 2:
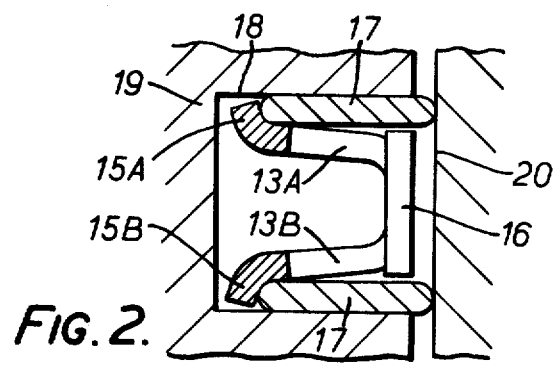
Figure 3:
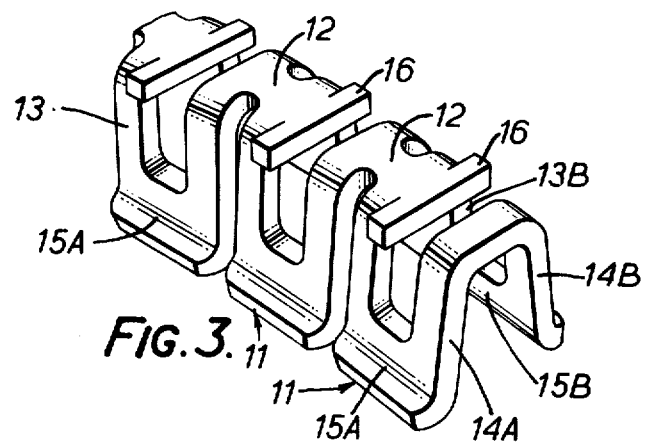
Figure 4:
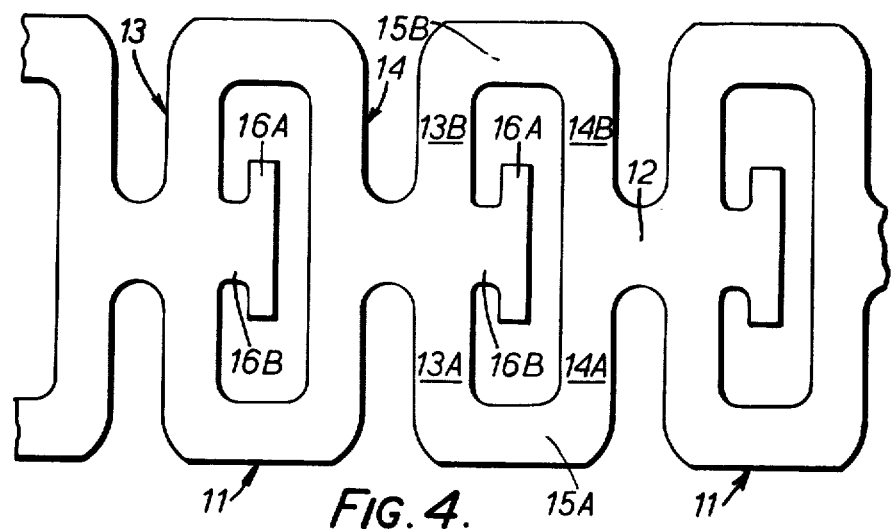
Figure 5:
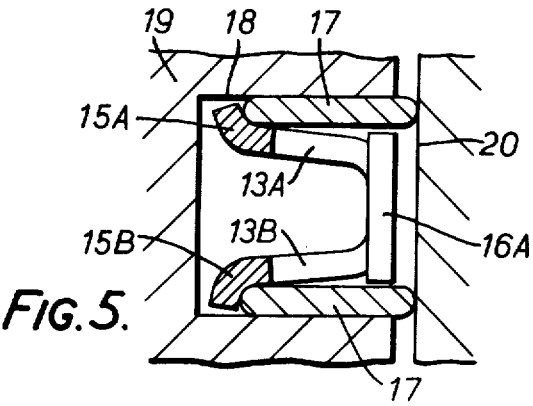
Figure 6:
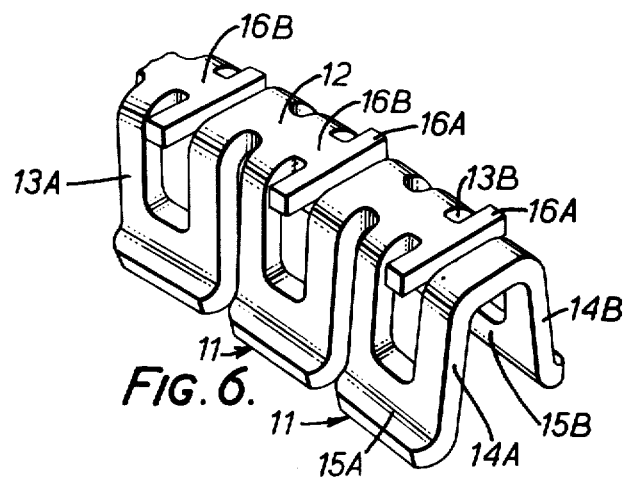
Figure 7:
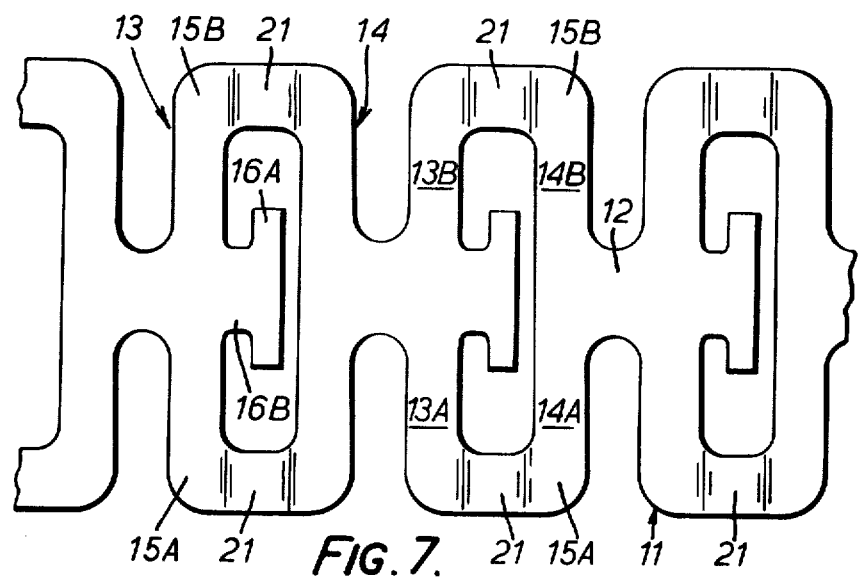
Figure 8:
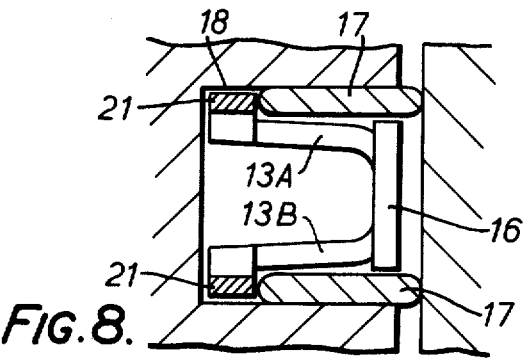
Figure 9:
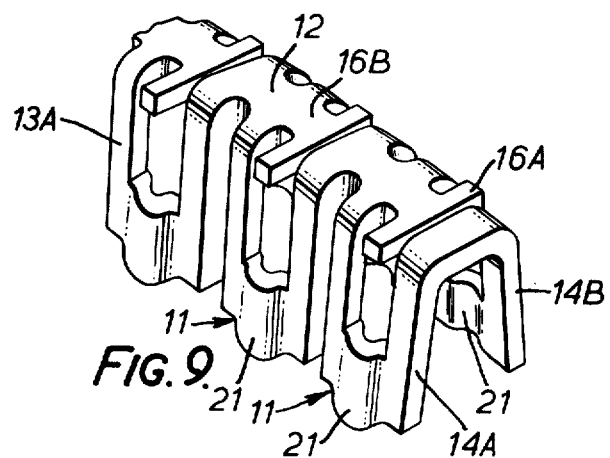

Three embodiments in accordance with the invention will now be described with reference to the accompanying drawings, of which:

FIG. 1 is a plan view of a blank for a spacer-expander element,

FIG. 2 is a transverse section of a piston ring incorporating a spacer-expander element, formed from the blank of FIG. 1, assembled in a piston ring groove, FIG. 3 is a perspective view of part of the spacer-expander element of FIG. 2, FIG. 4 is a view corresponding to FIG. 1 of a blank for a second embodiment, FIG. 5 is a view corresponding to FIG. 2 showing a transverse section of a second embodiment of piston ring assembled in a piston ring groove, FIG. 6 is a perspective view of part of the spacer-expander element of the second embodiment, FIG. 7 is a view corresponding to FIGS. 1 and 4 of a blank for a third embodiment, FIG. 8 is a view corresponding to FIGS. 2 and 5 showing a transverse section of a third embodiment, and FIG. 9 is a view corresponding to FIGS. 3 and 6 of the spacer-expander element of the third embodiment.

Referring to FIGS. 1 to 3, the spacer-expander element blank is formed by stamping from a flat strip of spring steel. In this condition the blank consists of a series of parts 11 each of which is substantially rectangular with rounded corners, each part being inter-connected to the next adjacent part on each side by a central strip 12 (except at the two ends of the spacer-expander element which abut one another). Each part 11 consists of two pairs of limbs 13, 14, the limbs 13A, 13B extending on opposite sides of the centre of the element, and the limbs 14A, 14B, of the other pair likewise extending on opposite sides of the centre. The free ends of the limbs 13A, 14A are interconnected by a part 15A which extends parallel to the axis of the element, and likewise the free ends of limbs 13B, 14B, are interconnected by a similar part 15B. Within the approximately rectangular area of each of the series of parts 11 defined by limbs 13, 14, and parts 15, there is a spacer element 16 connected centrally of the pair of limbs 13, the connection thus being aligned with that of strip 12.

The flat blank shown in FIG. 1 is bent by means of a stamping operation substantially along four fold lines to the configuration shown in FIGS. 2 and 3. It will be seen that the limbs 13, 14, are bent through nearly a right-angle, substantially along two fold lines which are parallel to the axis of the element and are spaced close to but on each side of the central inter-connecting strip 12. It will be understood that the bend has a small radius dictated by practical considerations. However, in bending the limbs 13, 14, radially inwardly from the central portion of the element, the spacer elements 16 which are connected to the centre are not bent inwardly, and a shearing action therefore takes place by which the outer parts of the spacer element 16 are separated from the limbs 13A, 13B.

Towards their extremities the limbs 13, 14, are bent in the opposite sense, i.e. so that their extremities extend at least partly in the axial direction of the ring, inwardly of the spacer element 16. These extremities of the limbs 13, 14, are interconnected by parts 15, and it will be understood that in use in an engine the free ends of the limbs 13, 14, together with the parts 15 will be deflected inward by radially inward pressure of the ring elements 17, and will therefore resiliently urge the ring elements 17 outward. The ring elements 17 are spaced apart by the spacer element 16 at the radially outer periphery of the spacer-expander element. When installed in an engine the piston ring assembly is housed in a groove 18 in a piston 19, and the radially outer circumferences of the ring elements 17 co-operate with a cylinder wall 20.

It will be apparent that the spacing between the pair of limbs 13 of one part 11 and those 14 of the adjacent part 11 is dictated by the size of press tool required to cut the 'U'-shaped slots, by which the interconnecting strip 12 is formed. Likewise the spacings between limb 13 and limb 14 of each part 11 is determined by the thickness of press tool required and by the width (measured in the circumferential direction) of the spacer element 16.

In the embodiment shown in FIGS. 4, 5 and 6 the piston ring is similar to that shown in FIGS. 1 to 3, except that the spacer element 16A forms the cross-bar of a 'T'-shaped cantilever, the arm 16B of which is connected to the centre of the corresponding part 11 opposite the interconnecting strip 12. In this case it is clear that if the same gap is allowed between the spacer element 16, 16A and the adjacent limb 14 to accommodate the width of the press tool, the spacings between limbs 13 and 14 of each part will be greater than in the first embodiment by the length of the cantilever arm 16B, and accordingly the spring rate of the limbs will not be as low as in the first embodiment.

The embodiment shown in FIGS. 7 to 9 is a modification of that shown in FIGS. 4 to 6, in which each part 15A, 15B, interconnecting the free ends of the limbs 13, 14, is formed with a crimp 21. The crimp is preferably formed simultaneously with the bending of the flat blank and has the effect of drawing limbs 13, 14, closer together, by effectively shortening the interconnecting parts 15A, 15B. The crimps 21 are preferably convex outward, so that in use the inner circumferences of the ring elements 17 rest on the sides of the crimps.

In other respects the second and third embodiments are similar to the first.

It will be understood that because the spacer-expander element has its free ends in abutment, reduction of the diameter of the two ring elements (by closing the gap in their periphery) places the spacer-expander element in compression, and thus causes the spacer-expander element to resiliently load the ring elements in the outward direction. Moreover, because the limbs 13, 14 of the spacer-expander element are not employed to space apart the ring elements 17, it is not necessary for these to lie in radial planes, but as shown in FIGS. 2, 5 and 8 they may be designed with an axial component. Because of this, compression of the spacer-expander element may take place not only by closing of the gaps between adjacent limbs 14, 13, bringing the adjacent ends of the circumferential parts 15A, on one side and 15B on the other, nearer to one another in the circumferential direction, but also compression of the spacer-expander may take place by closing of the gap between limbs 13A, 14A on one side, and limbs 13B, 14B on the other side, thus bringing circumferential parts 15A nearer to circumferential parts 15B, in the direction parallel to the central axis of the piston ring.

An important feature of the piston ring in accordance with the invention is that the spacer elements 16 lie between pairs of limbs 13, 14, of each part 11. This enables adjacent parts 11 to be spaced apart by the minimum distance required to enable a press tool to blank out the slots between adjacent limbs 13, 14 which define the central interconnecting strip 12.

Moreover, in the preferred embodiment of FIG. 1, because the spacer element 16 is sheared from limbs 13A, 13B by the press tool, and the spacer element is spaced at the minimum distance from limbs 14A, 14B required for a press tool to blank out the metal between, the maximum number of parts 11 may be acheived in a given circumferential length.

In the embodiment of FIGS. 4, 5 and 6 a somewhat greater distance is required between limbs 13, 14 of each part 11 to enable the arm 16B to be blanked out. However, this is overcome in the embodiment of FIGS. 7, 8 and 9 by crimping the parts 15 to draw together the limbs 13, 14 of each part 11.

The crimping operation may, if desired, also be applied to the embodiment of FIGS. 1 to 3.

It will also be understood that piston rings of the kind described are employed for oil control purposes.

The embodiments are described by way of example only, and variations are possible within the scope of the invention.

What I claim is:

1. A piston ring assembly including two ring elements and a spacer-expander element which spaces apart the ring elements and resiliently loads them in a radially-outward direction, the spacer-expander element having its free ends in abutment and including a series of interconnected parts, short circumferential connecting means at the radially outer periphery of said spacer-expander element to interconnect adjacent parts, each part comprising two spaced-apart pairs of limbs bent inwardly through nearly a right angle from said connecting means, the limbs of each pair being connected only at their inner ends, the inner ends of said limbs being interconnected by respective spaced-apart portions which extend circumferentially and axially of the element, and the respective spaced-apart portions being in contact with and resiliently outwardly loading the ring elements, the spacer-expander element including at the outer periphery thereof a spacer element between the two pairs of limbs of each said part, said spacer element being connected to the center of said part and extending transversely to space apart said ring elements at the outer periphery of the spacer-expander element.

2. A piston ring assembly as claimed in claim 1, wherein said connecting means comprises central strips between the neighboring pairs of limbs of adjacent parts, and said spacer-expander element is symmetrical about a transverse plane at right angles to the central axis of the piston ring.

3. A piston ring assembly as claimed in claim 1, wherein said spacer element is in the form of a straight bar extending parallel to the central axis of the piston ring.

4. A piston ring assembly as claimed in claim 1, wherein said spacer element is closely adjacent (in the circumferential direction) to one of said pairs of limbs.

5. A piston ring assembly as claimed in claim 1, wherein the spacer element forms the cross-bar of a 'T'-shaped member which is cantilevered between the limbs of each said part, the cross-bar being spaced from each of said pairs of limbs.

6. A piston ring assembly as claimed in claim 1, wherein the circumferentially and axially-extending portions which interconnect the radially-inner ends of the limbs are crimped, whereby to draw the two pairs of limbs of a part closer together, the ring elements of the piston ring being supported and resiliently urged by the crimped portions.

* * * * *